United States Patent Office 2,853,510
Patented Sept. 23, 1958

2,853,510

PROCESS FOR PRODUCING MONOCYANOETHYL DERIVATIVES OF POLYHYDROXY COMPOUNDS

Amelio E. Montagna and Eldon C. Stout, South Charleston, W. Va., assignors to Union Carbide Corporation, a corporation of New York No Drawing. Application July 12, 1956
Serial No. 597,318

8 Claims. (Cl. 260—465.6)

This invention relates to the cyanoethylation of polyhydroxy compounds. More particularly, the present invention relates to an improved process for the production of monocyanoethyl derivatives of polyhydroxy compounds.

The cyanoalkylation of alcohols, using acrylonitrile as cyanoethylating agent, is known. It is also known that primary and secondary hydroxyl groups of polyhydric alcohols can be cyanoethylated. Completely cyanoethylated derivatives of polyhydroxy compounds have been readily obtained by utilizing at least one molecule of acrylonitrile for each hydroxyl group in the polyhydroxy molecule. However, no completely satisfactory method is known for producing monocyanoethyl derivatives of polyhydroxy compounds. By utilizing a relatively high mol ratio of polyhydroxy compound to acrylonitrile, the monocyanoethyl derivative can be formed as a major product. However, such a procedure suffers from at least two disadvantages which make it undesirable from a commercial standpoint. One disadvantage is that the space-time yield is extremely low and another disadvantage is that large amounts of polyhydroxy compound must be used, thus requiring cumbersome recovery operations.

We have discovered a process, whereby monocyanoethyl derivatives of polyhydroxy compounds can be efficiently and economically produced with substantially no net production of undesired polycyanoethyl derivatives.

In accordance with our invention, acrylonitrile is reacted in a primary reaction zone with a polyhydroxy compound, preferably in the presence of an alkaline condensing agent, at a mol ratio that gives a high space-time yield of monocyanoethyl derivative, as well as substantial amounts of polycyanoethyl derivatives. Suitable ratios of acrylonitrile to polyhydroxy compound may range between about 0.15 and about 0.8 mole of acrylonitrile for each hydroxyl equivalent in the polyhydroxy compound. Preferably between about 0.25 and 0.6 mole of acrylonitrile is present for each hydroxyl equivalent in the polyhydroxy compound. The reaction product is separated, by distillation or other suitable means, into three fractions: (1) an unreacted polyhydroxy compound fraction, (2) a monocyanoethyl derivative fraction and (3) a polycyanoethyl derivatives fraction. The polycyanoethyl derivatives fraction is then subjected to what may be referred to as a recycling operation. The recycling operation may comprise introducing said fraction into a second separate reaction zone in which it is mixed with additional acrylonitrile and polyhydroxy compound, or it may comprise reacting said fraction solely with the polyhydroxy compound, which may advantageously be fraction (1) of unreacted polyhydroxy compound described above, or it may comprise returning said fraction to the primary reaction zone, either alone or together with the polyhydroxy compound.

The recycling is applicable to batch operation, as well as to continuous operation. In a continuous type of operation, acrylonitrile and the polyhydroxy compound are both fed to a reaction zone, a reaction effluent is removed from said zone and is separated as by distillation into three fractions as described above. The monocyanoethyl derivative fraction is taken as a product and the polycyanoethyl derivatives fraction and the unreacted polyhydroxy compound fraction are recycled to the reaction zone.

By utilizing a recycling operation, in any of the ways described above, substantially all of the polycyanoethyl derivatives are converted to monocyanoethyl derivatives. Thus, the acrylonitrile and polyhydroxy compound are ultimately converted only to the monocyanoethyl derivative and the net production of polycyanoethyl derivatives is substantially eliminated.

The present invention is applicable to a wide variety of polyhydric alcohols of the aliphatic, cycloaliphatic, and arylaliphatic series. These can be saturated or unsaturated and may be interrupted by one or more oxygen or sulfur atoms in their molecule.

Polyhydric alcohols suitable for the purpose of this invention are such diols as ethylene glycol and its homologues, including, for example, propylene, butylene, amylene and hexylene glycols, as well as polymethylene glycols such as trimethylene, tetramethylene, pentamethylene, hexamethylene and decamethylene glycols. Polyalkylene glycols may also be used, for example diethylene glycol, dipropylene glycol, triethylene glycol and tetraethylene glycol, also sulfur analogues thereof such as thio-di-ethylene glycol $HOCH_2CH_2SCH_2CH_2OH$. Also suitable are polyhydric alcohols such as glycerol, 1,1,1-trimethylol-propane, glycerylalpha-methyl ether, cyclohexane-diols, and the like.

Alkaline condensing agents are suitable for promoting the reaction. Of these, the most effective are alkali metal hydroxides and alkoxides or quaternary ammonium hydroxides which may be added in solid form or in alcoholic or in aqueous solutions if desired. Particularly useful are sodium hydroxide, potassium hydroxide, lithium hydroxide and trimethyl benzyl ammonium hydroxide.

The alkaline condensing agent used can be used in small, catalytic amounts corresponding on the dry basis to 0.005 to 5% on the weight of the polyhydric alcohol used being usually sufficient with amounts of from 0.01 to 0.5% being preferred. The catalyst in aqueous or alcoholic solution or as the solid material may be mixed directly with the polyhydric alcohol if it be a liquid, or with a solution of the polyhydric alcohol in dioxane, tertiary butyl alcohol or other suitable inert liquid.

The condensation takes place readily at ordinary room temperature and proceeds at temperatures as low as 0° C., although slowly. The reaction is greatly accelerated at 40° to 95° C. Temperatures higher than 95° C. tend to destroy the catalyst by saponification of the nitrile and may also result in polymerization.

The reaction is exothermic and it is advantageous to moderate the vigor of the condensation by cooling at the start and by adding the unsaturated nitrile gradually.

The polycyanoethyl compounds for the recycling operation may be distilled prior to use, if desired. Undistilled material, can also be used such as would remain as residue after the monocyanoethyl product has been separated from the initial cyanoethylation reaction mixture, as by distillation.

The recycling operation may be conducted under substantially the same reaction conditions of temperature and pressure as the primary reaction. Preferably, the same catalyst is utilized. The operation is preferably conducted at a temperature of from about 50 to about 90° C. Thus, when the polycyanoethyl fraction is directly returned to the primary reaction zone, as is readily done in a continuous process, said zone is preferably maintained at 50 to 90° C. during the entire process.

The following examples are illustrative. Examples 1, 2, and 3 illustrate the recycling operation in which the polycyanoethyl derivatives fraction is reacted with only the polyhydroxy compound in a secondary reaction zone.

*Example 1*

A mixture comprising 1006 grams (9.49 moles) of diethylene glycol and 500 grams (2.36 moles) of dicyanoethyl ether of diethylene glycol (boiling point, 180° C. at about 1.5 mm. of mercury pressure), with 0.56 gram of sodium hydroxide as catalyst, was reacted at a constant temperature of about 80° C. in a vessel, equipped with adequate agitating means, for a period of 12 hours. At the end of the reaction period, a 507-gram portion (33.65 percent) of the product was made slightly acidic by the addition of 0.15 ml. of concentrated sulfuric acid. The acidified portion was fractionally distilled, at reduced pressure, through a packed still column. The distillation yielded 2 grams of low-boiling material, 272 grams of diethylene glycol, 175 grams of monocyanoethyl ether of diethylene glycol (boiling range of 122 to 128° C. at about 1.2 mm. Hg), and 43 grams of residue composed primarily of the dicyanoethyl ether of diethylene glycol.

Of the total diethylene glycol equivalent of the starting mixture (11.85 moles=9.49 moles charged as diethylene glycol, plus 2.36 moles charged as dicyanoethyl ether of diethylene glycol), 64 percent (7.62 moles) was recovered as diethylene glycol, 28 percent (3.27 moles) as monocyanoethyl ether of diethylene glycol, and 5 percent (0.60 mole) as dicyanoethyl ether of diethylene glycol; a total recovery of 97 percent.

Of the acrylonitrile equivalent of the starting mixture (4.72 moles=2 times 2.36 moles of dicyanoethyl ether of diethylene glycol), 69 percent (3.27 moles) was recovered as monocyanoethyl ether of diethylene glycol, and 25 percent (1.20 moles) was recovered as dicyanoethyl ether of diethylene glycol; a total recovery of 94 percent.

*Example 2*

A mixture identical with that of Example 1 was held at 60° C. for a period of 24 hours. A 546-gram portion (36.2 percent) of the reaction product was acidified with 0.18 ml. of concentrated sulfuric acid and was then fractionally distilled as in Example 1, yielding 3 grams of low-boiling material, 293 grams of diethylene glycol, 179 grams of the monocyanoethyl ether of diethylene glycol, and 55 grams of residue composed primarily of the dicyanoethyl ether of diethylene glycol.

Of the total diethylene glycol equivalent of the starting mixture, 64 percent was recovered as diethylene glycol, 26 percent was recovered as the monocyanoethyl ether, and 6 percent as the dicyanoethyl ether; a total recovery of 96 percent. Of the total acrylonitrile equivalent of the starting mixture, 66 percent was recovered as the monocyanoethyl ether, and 30 percent as the dicyanoethyl ether; a total recovery of 96 percent.

*Example 3*

A mixture of 760 grams (7.16 moles) of diethylene glycol, 711 grams (3.35 moles) of undistilled di-cyanoethyl ether of diethylene glycol, and 0.9 gram of sodium hydroxide was reacted for 4 hours at 80° C. The undistilled di-cyanoethyl ether comprised the total residue from the distillation of a reaction product made by cyanoethylation of diethylene glycol with acrylonitrile, after removal of the diethylene glycol and the mono-cyanoethyl ether. After reaction, the mixture was acidified with 0.7 ml. of concentrated sulfuric acid and was distilled, yielding 1 gram of low boiling material, 615 grams (5.80 moles) of diethylene glycol, 593 grams (3.73 moles) of mono-cyanoethyl ether, and 230 grams (1.085 moles) of residue composed primarily of the di-cyanoethyl ether.

Of the total diethylene glycol equivalent of the charge (10.51 moles), 55 percent was recovered as diethylene glycol, 35 percent as mono-cyanoethyl ether, and 10 percent as di-cyanoethyl ether, for a total recovery of 100 percent. Of the total acrylonitrile equivalent (6.70 moles), 56 percent was recovered as mono-cyanoethyl ether and 32 percent as di-cyanoethyl ether, for a total recovery of 88 percent.

*Example 4*

This example illustrates the primary reaction of acrylonitrile with the polyhydroxy compound without recycling of the polycyanoethyl derivatives fraction.

A mixture of 3015 grams (28.4 moles) of diethylene glycol and 1.3 grams of sodium hydroxide was reacted with 984 grams (18.6 moles) of acrylonitrile. The reaction was conducted by feeding the acrylonitrile to the agitated solution of diethylene glycol and sodium hydroxide, over a period of 8 hours, while maintaining the reaction temperature at 40° C. The reaction product was acidified with 1.7 ml. of concentrated sulfuric acid and was distilled, giving 14 grams of low-boiling material, 1365 grams (12.9 moles) of diethylene glycol, 1913 grams (12.0 moles) of mono-cyanoethyl ether, and 711 grams (3.35 moles) of residue di-cyanoethyl ether. Thus, in this ordinary cyanoethylation of diethylene glycol, the following results were obtained: of the diethylene glycol input, 45 percent was recovered as diethylene glycol, 42 percent as mono-cyanoethyl ether, and 12 percent as di-cyanoethyl ether, for a total recovery of 99 percent; of the acrylonitrile input, 64 percent was recovered as mono-cyanoethyl ether and 36 percent as di-cyanoethyl ether, for a total recovery of 100 percent.

*Example 5*

This example illustrates the recycling operation in which the polycyanoethyl derivatives fraction is reacted with additional acrylonitrile and polyhydroxy compound.

A mixture of 647 grams (6.10 moles) of diethylene glycol, 204 grams (0.96 mole) of undistilled di-cyanoethyl ether of di-ethylene glycol, and 0.6 gram of sodium hydroxide was reacted at 80° C. for 4 hours. Then, the mixture was cooled to 40° C., and 146 grams (2.76 moles) of acrylonitrile was added over a period of 2 hours at 40° C. The final reaction mixture was acidified with 0.4 ml. of concentrated sulfuric acid and was distilled, yielding 7 grams of low-boiling material, 340 grams (3.21 moles) of diethylene glycol, 473 grams (2.97 moles) of mono-cyanoethyl ether, and 178 grams (0.84 mole) of residue dicyanoethyl ether.

Of the total diethylene glycol equivalent of the input (7.06 moles), 45 percent was recovered as diethylene glycol, 42 percent as mono-cyanoethyl ether, and 12 percent as di-cyanoethyl ether, for a total recovery of 99 percent. Of the total acrylonitrile equivalent (4.68 moles), 63 percent was recovered as mono-cyanoethyl ether, and 36 percent as di-cyanoethyl ether, for a total recovery of 99 percent. On the basis of only the diethylene glycol charged as such (6.10 moles), the yield of diglycol was 53 percent, the yield of mono-cyanoethyl ether was 49 percent, while the net yield of di-cyanoethyl ether was —2 percent, for a total of 100 percent. On the basis of only the acrylonitrile added as such (2.76 moles), the yield of mono-cyanoethyl ether was 108 percent and the net yield of di-cyanoethyl derivative was —9 percent, for a total of 99 percent.

*Example 6*

This example illustrates the primary reaction of a polyhydroxy compound and acrylonitrile without recycling of the polycyanoethyl derivatives fraction, followed by hydrogenation of the reaction product to produce the corresponding 3-aminopropyl derivatives.

A solution of 17.5 grams of sodium hydroxide in 3482.5 grams (32.85 moles) of diethylene glycol was reacted with 1,167 grams (22.0 moles) of acrylonitrile. The acrylonitrile was added over a period of 4.25 hours and the temperature of the reaction mixture was held at 20 to 22° C.

To the reaction product were added 27 grams of glacial acetic acid, 3630 grams of methanol, 260 grams of Raney nickel, and 372 grams of ammonia. This mixture was hydrogenated in a stirred autoclave at 99° C. and 1000 p. s. i. g. for a period of 3 hours.

The cooled reaction mixture was filtered to remove the Raney nickel and then was strip-distilled through a gooseneck, first at atmospheric pressure to remove the methanol and the ammonia, and then under vacuum. A fraction distilling at a vapor temperature of 64 to 192° C. at 3 mm. Hg and weighing 4337 grams was collected. This material was fractionally distilled under vacuum through a packed column. There were obtained 1,670 grams of diethylene glycol (boiling point, 115° C. at 5 mm. Hg), 2,186 grams of mono-3-aminopropyl ether of diethylene glycol (boiling point, 140° C. at 5 mm. Hg), and 426 grams of di-3-aminopropyl ether of diethylene glycol (boiling point, 140° C. at 2 mm. Hg). These results represent a yield of mono-aminopropyl ether of 61 percent based on acrylonitrile and 41 percent based on diglycol, and an efficiency of 78 percent based on diglycol. The yield of di-aminopropyl ether was 18 percent based on acrylonitrile and 6 percent based on diglycol, with an efficiency of 11 percent based on diglycol.

*Example 7*

This example illustrates the primary reaction of a polyhydroxy compound and acrylonitrile, with exhaustive recycling of the polycyanoethyl derivatives fraction and recovered polyhydroxy compound to a secondary reaction zone, followed by hydrogenation of the reaction product.

A solution of 1.3 grams of sodium hydroxide in 3,039 grams (28.65 moles) of diethylene glycol was reacted with 984 grams (18.55 moles) of acrylonitrile. The acrylonitrile was added over a period of 8 hours and the temperature was held at 38 to 42° C.

To the reaction product was added 3.1 grams of sulfuric acid and the mixture was distilled under vacuum through a 30 mm. by 270 mm. still column packed with stainless steel protruded packing. The following fractions were recovered: (1) an unreacted diglycol fraction, B. P. up to 81° C. at 1.2 mm. Hg, 1,077 grams; (2) an intermediate fraction, B. P. 81 to 126° C. at 1.2 mm. Hg, 288 grams; (3) a mono-cyanoethyl ether fraction, B. P. 126 to 133° C. at 1.2 mm. Hg, 1,913 grams; and (4) a residue containing the di-cyanoethyl ether, 711 grams.

The above residue (711 grams) and a portion of the recovered diglycol fraction (750 grams) were charged to the secondary reaction zone, 0.9 gram of sodium hydroxide was added, and the mixture was heated at 80° C. for 4 hours. The mixture was cooled and there was added 1.3 grams of sulfuric acid. This mixture was distilled as above to recover 498 grams of diglycol fraction, 117 grams of intermediate fraction, 593 grams of mono-cyanoethyl ether fraction, and 230 grams of residue (di-cyanoethyl ether fraction).

The above residue (230 grams), 242 grams of the recovered diglycol, and 0.6 gram of sodium hydroxide, were mixed and heated at 80° C. for 4 hours. After cooling there was added 0.9 gram of sulfuric acid and the mixture was distilled as before. There were obtained 230 grams of a mixture of diglycol and mono-cyanoethyl ether, 68 grams of mono-cyanoethyl ether fraction, and 180 grams of residue.

The above residue (180 grams) was recycled once more, this time with 475 grams of recovered diglycol and 0.6 gram of sodium hydroxide. The reaction was carried out at 80° C. for 4 hours, and to the cooled product was added 1.3 grams of sulfuric acid. This mixture was flash-distilled through a gooseneck to a vapor temperature of 195° C. at 1.2 mm. Hg. The total distillate weighed 618 grams. There remained 48 grams of residue which was discarded.

The total distillates remaining from the above operations were combined and amounted to 3,935 grams. To this material were added 2,620 grams of butanol, 222 grams of Raney nickel, and 154 grams of ammonia, and this mixture was hydrogenated in a stirred autoclave at 100° C. to 105° C. and 145 to 155 p. s. i. g. for a period of 3.1 hours.

The hydrogenated product was filtered to remove the Raney nickel and was distilled as in Example 6 through a 40 mm. by 630 mm. still column packed with stainless steel protruded packing. There were obtained 1,237 grams of diglycol and 2,445 grams of mono-aminopropyl ether. These results represent a yield of mono-aminopropyl ether of 81 percent based on acrylonitrile and 56 percent based on diglycol, and an efficiency of 88 percent based on diglycol.

We claim:

1. A process for producing monocyanoethyl derivatives of polyhydroxy compounds, which comprises reacting acrylonitrile with an aliphatic polyhydroxy compound selected from the group consisting of di- and trihydroxy compounds, in a ratio of from about 0.15 to about 0.8 mole of acrylonitrile for each hydroxyl equivalent in the polyhydroxy compound in a reaction zone to produce both a monocyanoethyl derivative and polycyanoethyl derivatives; separating the reaction effluent into an unreacted polyhydroxy compound fraction, a monocyanoethyl derivative fraction and a polycyanoethyl derivative fraction, and combining said polycyanoethyl derivative fraction with said polyhydroxy compound to form a monocyanoethyl derivative.

2. The process of claim 1, wherein the polyhydroxy compound which is combined with said polycyanoethyl derivative fraction is said unreacted polyhydroxy compound fraction.

3. The process of claim 1, wherein said polycyanoethyl derivative fraction is combined with acrylonitrile, as well as with said polyhydroxy compound.

4. The process of claim 1, wherein said polycyanoethyl derivative is returned to said reaction zone to be combined with said polyhydroxy compound.

5. A process for producing monocyanoethyl derivatives of polyhydroxy compounds, which comprises reacting acrylonitrile at a temperature of from about 0° C. to about 95° C., with an aliphatic polyhydroxy compound selected from the group consisting of di- and trihydroxy compounds, in a ratio of from about 0.15 to about 0.8 mole of acrylonitrile for each hydroxyl equivalent in the polyhydroxy compound in a reaction zone to produce both a monocyanoethyl derivative and polycyanoethyl derivatives; separating the reaction effluent into an unreacted polyhydroxy compound fraction, a monocyanoethyl derivative fraction and a polycyanoethyl derivative fraction and combining said polycyanoethyl derivative fraction with said polyhydroxy compound to form a monocyanoethyl derivative.

6. The process of claim 5, wherein the polyhydroxy compound which is combined with said polycyanoethyl derivative fraction is said unreacted polyhydroxy compound fraction.

7. The process of claim 5, wherein said polycyanoethyl derivative fraction is combined with acrylonitrile, as well as with said polyhydroxy compound.

8. The process of claim 5, wherein said polycyanoethyl derivative is returned to said reaction zone to be combined with said polyhydroxy compound.

References Cited in the file of this patent

UNITED STATES PATENTS

| | | |
|---|---|---|
| 2,437,905 | Bruson | Mar. 16, 1948 |
| 2,495,214 | Crews | Jan. 24, 1950 |
| 2,579,580 | Hawk et al. | Dec. 25, 1951 |
| 2,598,174 | Hutchinson | May 27, 1952 |